United States Patent
Cannon

(10) Patent No.: US 12,222,495 B2
(45) Date of Patent: Feb. 11, 2025

(54) TELESCOPE AND SENSOR SYSTEMS AND METHODS

(71) Applicant: TELEDYNE FLIR DEFENSE, INC., Thousand Oaks, CA (US)

(72) Inventor: Bruce Cannon, Portland, OR (US)

(73) Assignee: TELEDYNE FLIR DEFENSE, INC., Thousand Oaks, CA (US)

( * ) Notice: Subject to any disclaimer, the term of this patent is extended or adjusted under 35 U.S.C. 154(b) by 40 days.

(21) Appl. No.: 17/750,251

(22) Filed: May 20, 2022

(65) Prior Publication Data

US 2022/0382049 A1 Dec. 1, 2022

Related U.S. Application Data

(60) Provisional application No. 63/194,975, filed on May 29, 2021.

(51) Int. Cl.
| | | |
|---|---|---|
| *G02B 27/00* | (2006.01) | |
| *G02B 23/02* | (2006.01) | |
| *G02B 27/14* | (2006.01) | |
| *H04N 23/55* | (2023.01) | |

(52) U.S. Cl.
CPC ......... *G02B 27/0081* (2013.01); *G02B 23/02* (2013.01); *H04N 23/55* (2023.01); *G02B 27/141* (2013.01)

(58) Field of Classification Search
CPC .. G02B 27/0081; G02B 23/02; G02B 27/141; G02B 27/1066; G02B 17/0642; G02B 15/02; G02B 5/006; G02B 23/04; G02B 23/12; H04N 23/55

See application file for complete search history.

(56) References Cited

U.S. PATENT DOCUMENTS

| | | | |
|---|---|---|---|
| 4,834,517 | A | 5/1989 | Cook |
| 5,363,235 | A | 11/1994 | Kiunike et al. |
| 8,759,735 | B2 | 6/2014 | Cook et al. |
| 8,801,202 | B2 | 8/2014 | Cook |
| 9,389,411 | B1 | 7/2016 | Granger et al. |
| 10,732,378 | B2 | 8/2020 | Cannon et al. |
| 10,948,702 | B2 | 3/2021 | Greenland et al. |
| 11,698,526 | B2 * | 7/2023 | Sinclair ............... G02B 17/084 359/351 |
| 2005/0029458 | A1 * | 2/2005 | Geng ............... G08B 13/19632 250/347 |

(Continued)

*Primary Examiner* — Boubacar Abdou Tchoussou
(74) *Attorney, Agent, or Firm* — Haynes and Boone, LLP

(57) ABSTRACT

A system comprises a sensor subsystem for imaging an object space, and a telescope for coupling electromagnetic energy from the object space to the sensor subsystem. The system comprises a bypass optical path that bypasses the telescope on the way to the sensor subsystem in order to provide a larger field of view of the object space. The bypass path and the telescope path merge at a merging point between the telescope and the sensor subsystem, and are disjoint upstream of the merging point. A simple bypass configuration is therefore provided, with possibly just a single fold mirror at the merging point. A sensor may form an intermediate image, and a frame is placed at the intermediate image to reject stray radiation and provide a real and accessible intermediate pupil for the sensor. Other features are also provided.

20 Claims, 10 Drawing Sheets

(56) References Cited

U.S. PATENT DOCUMENTS

| | | |
|---|---|---|
| 2006/0171022 A1* | 8/2006 | Lundgren .......... G02B 17/0615 |
| | | 359/399 |
| 2009/0237784 A1 | 9/2009 | Cook |
| 2010/0321808 A1 | 12/2010 | Bentley et al. |
| 2015/0028194 A1 | 1/2015 | Cook |
| 2019/0179129 A1* | 6/2019 | Miller .................... G02B 7/182 |
| 2021/0168352 A1* | 6/2021 | Silverstein ............. G02B 6/353 |
| 2022/0011564 A1* | 1/2022 | Tejada ............... G02B 27/1013 |
| 2022/0300000 A1* | 9/2022 | Poluboiarinov ..... G05D 1/0214 |

* cited by examiner

TELESCOPE AND SENSOR SYSTEMS AND METHODS

CROSS REFERENCE TO RELATED APPLICATIONS

This application claims the benefit of and priority to U.S. Provisional Application No. 63/194,975 filed May 29, 2021 and entitled "TELESCOPE AND SENSOR SYSTEMS AND METHODS," which is hereby incorporated by reference in its entirety.

TECHNICAL FIELD

One or more embodiments relate to optical systems with telescopes and sensors.

BACKGROUND

Telescope/sensor systems are widely used for aerial surveillance and other applications. A telescope can capture and enlarge an image of an area of interest, and provide the enlarged image to a camera sensor. The sensor converts the image to electrical signals suitable for displaying the image on a computer monitor, storing the image in a computer memory, or for other processing.

A telescope should preferably have a controllable field of view to enable zooming in or out of images. Also, the sensor should provide high quality images. The telescope and the sensor should preferably be simple to manufacture and should have a small size and weight for easy, precise positioning by automatic positioning devices such as an electronically controlled gimbal. Small size and weight also help in using the telescope/sensor system on a movable platform such as aircraft or other type of vehicle.

There is therefore a need to provide simple, reliable telescope/sensor systems that can be manufactured in small size and weight and provide good image quality.

SUMMARY

Some embodiments of the present disclosure provide simple telescope/sensor systems with a controllable field of view (FOV). The FOV can be changed using a simple FOV switch, possibly including just one fold mirror. Further, the sensors coupled to the telescope can provide improved image quality, possibly using re-imaging optics.

While the invention is not limited to the features or advantages discussed above, some embodiments provide a system comprising a sensor subsystem comprising one or more sensors configured to sense electromagnetic radiation. The system also includes an optical subsystem defining a plurality of optical paths comprising at least a first optical path and a second optical path, each optical path being within the system, wherein each optical path is configured to carry electromagnetic radiation from an object space to the sensor subsystem. Further, the optical subsystem comprises a telescope, and the first optical path passes through the telescope. The second optical path does not pass through the telescope. The first and second optical paths merge at a merging point between the telescope and the sensor subsystem, and the first and second optical paths are disjoint upstream of the merging point. A magnification provided by the second optical path at the merging point is different from a magnification provided by the first optical path at the merging point.

Some embodiments provide a system comprising a sensor subsystem comprising one or more sensors configured to sense electromagnetic radiation. The system also includes a telescope having an output coupled to an input of the sensor subsystem. The one or more sensors comprise a first sensor which comprises a transducer configured to be in an image plane. The sensor subsystem comprising an optics assembly configured to form an image in the image plane for the transducer. The optics assembly forms an intermediate image, and the optics assembly comprises a frame around a location of the intermediate image, the frame being configured to reject stray light. In some embodiments, the intermediate image has a 1:1 size relationship to the image at the sensor's image plane.

Other systems are described below. Also described are methods of using and making systems the systems according to the present invention and possibly other systems. The invention is not limited to the embodiments discussed above except as defined by the appended claims.

DETAILED DESCRIPTION

Figure 1:
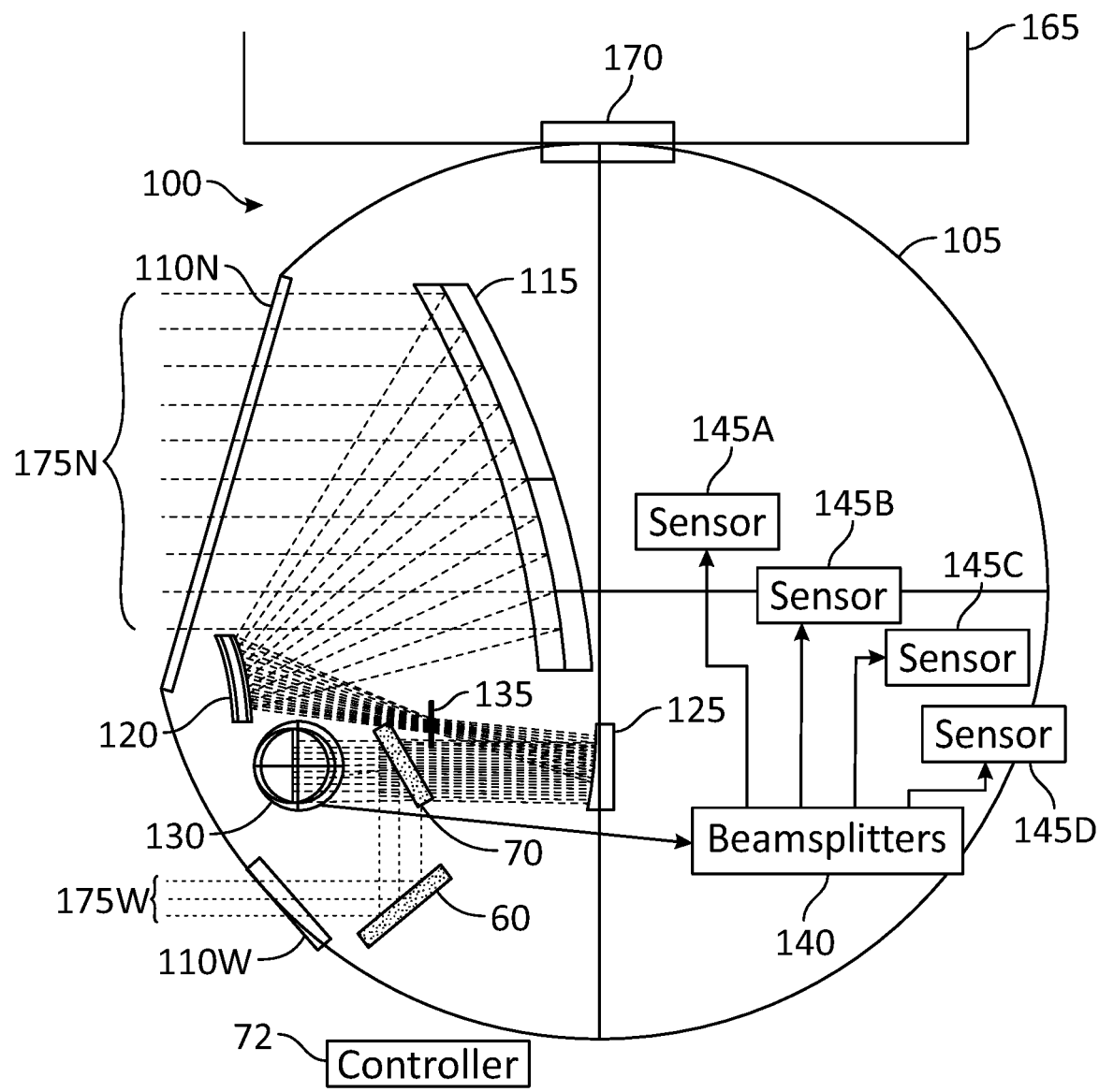
FIGS. 1 and 2 illustrate various features of exemplary optical systems with a controllable field of view (FOV) controlled by a simple FOV switch according to embodiments of the present disclosure.

Telescopes are widely used in sensor systems for surveillance and other applications. See for example U.S. Pat. No. 8,759,735, issued Jun. 24, 2014 to Cook et al., describing an aerial surveillance sensor system including a gimbaled telescope subsystem and a sensor subsystem. The telescope subsystem includes an afocal three-mirror anastigmat (TMA) telescope mounted on a gimbal and outputting a beam of radiation to the sensor subsystem. The sensor subsystem is mounted between the gimbal and an aircraft body.

As described in that patent, the telescope magnification provides a narrow field of view (NFOV), but the system can switch to a wide field of view (WFOV) by steering the incoming beam to bypass the telescope. The bypass optical path is split off from the incoming beam by a fold mirror in front of the telescope, and the two paths merge at the location of another fold mirror located after the telescope and before the sensor subsystem. There is also an additional mirror in the bypass path.

It is desirable to provide simple bypass configurations in a telescope/sensor system, especially where the weight and size of the system should be minimal (as in case of aerial surveillance). Also, it is known that sensor image quality can be improved by reducing stray radiation reaching the sensor image plane, and it is desirable to provide simple, reproducible structures for reducing stray radiation.

In accordance with various embodiments of the present disclosure, an improved sensor system is provided with a simple bypass switch and simple structures for reducing stray radiation. In particular, in some embodiments, the bypass configuration is simplified because the NFOV optical path (going through the telescope) and the bypass are disjoint up to a merging point between the telescope subsystem and the sensor subsystem. For example, in some embodiments, the bypass switch includes only one fold mirror, which can be placed at the merging point, and the bypass switch may need no other mirrors, though one or more fixed mirrors can also be provided. (Additional fold mirrors can also be provided to control the bypass path, but in some embodiments such additional fold mirrors do not have to move when switching between the NFOV path and the bypass.) Therefore, the structure can be reduced in size and weight by omitting actuators or motors or other devices needed for fold mirrors, and/or by providing greater image stability when switching between the paths. The small size and weight and high image stability are especially valuable for systems used in flight such as aerial surveillance systems.

Some telescope/sensor system embodiments are small and light-weight devices with the telescope subsystem and the sensor subsystem packaged in a flight-worthy ball or barrel in a nitrogen purged, clean environment. The package can be gimbaled with rotation in one, two, or more axes, possibly with stabilization servo control on each moving axis. When the package rotates about any one or more axes or translates in any direction, the package motion causes the telescope subsystem and the sensor subsystem to rotate together with the package around the same axis or axes, with the same angular speed as the package, and/or translate in the same direction with the same speed as the package. In some embodiments, there are no moving parts within the package except as needed for fold mirror control and focusing optics control. Improved simplicity and reliability are therefore achieved. But the invention is not limited to such construction. In fact, the structure can be used without a gimbal, and the invention is not limited to flight applications. Also, the invention is not limited to bypass switches using only one fold mirror, or even to bypass switches using mirrors, as non-mirror devices can be used to implement the merging point between the telescope and the sensor subsystem. Additional fixed or fold mirrors can be provided to adjust the bypass path. However, in some embodiments, the additional fold mirrors are not part of the bypass switch as they do not move when the bypass switch switches between the NFOV path and the bypass path.

In some embodiments, the bypass has a separate entrance window, but the NFOV and WFOV overlap.

In some embodiments, both WFOV and NFOV optical paths deliver afocal (collimated) radiation to the merging point. This simplifies using the same (shared) optics for WFOV and NFOV paths downstream of the merging point in the sensor subsystem.

In some embodiments the telescope is a TMA similar to the one described in U.S. Pat. No. 10,732,378, issued Apr. 4, 2020 to FLIR Systems, Inc. (inventor: Cannon et al.), incorporated herein by reference. For example, FIG. 1 shows a TMA with primary mirror 115, secondary mirror 120, and tertiary mirror 125, and exit pupil 130. The sensor subsystem includes multiple sensors (145A-145D) for respective different wavelength ranges, such as visible light, shortwave infrared (SWIR), mid wave infrared (MWIR), longwave infrared (LWIR), and possibly others. After the WFOV/NFOV merging point, the beam can be split into separate paths based on wavelengths for respective different sensors.

As an illustration (such as shown in FIGS. 1 through 7C), some embodiments use a TMA or other telescope having a magnification between 3× and 8×. The sensor subsystem optics (e.g. 320 in FIG. 4) may be refractive optics ("refractive telescope") with separate optical assemblies for each sensor (145A-145D) which are positioned behind the reflective telescope (TMA). These separate sensor paths are smaller in aperture and larger in field of view than the NFOV path from window 110N through the reflective telescope. In an exemplary embodiment, the reflective telescope is a 6× afocal off-axis TMA; the sensor subsystem includes a sensor (145, one of 145A-145D) having a one-degree FOV and a 6 inch aperture (an inch is 25.4 mm) when the reflective telescope is used (NFOV), but having a 6 degree FOV and a one-inch aperture if the reflective telescope is bypassed. The bypass is achieved by inserting one or two flat mirrors (60, 70) into the collimated radiation beam after the TMA exit mirror (e.g. tertiary mirror 125). Only one of the two flat mirrors (mirror 70) is movable. The other mirror(s) are fixed.

In an example, the same optical assembly can also be used in reverse, e.g. to direct radiation from a laser source (not shown) to the object space for target tracing or some other purpose. Both WFOV and NFOV paths can be used in reverse. In the reverse use, the inserted fold mirror (70) at the merging point of the two paths (branching point in the reverse use) directs the reverse beam away from the reflective telescope structure into the bypass path, and additional flat mirror(s) (60) can be optionally used to relay the bypass beam out to object space, possibly with the same or almost the same line of sight to a distant object as in the NFOV path. The two lines of sight can be almost parallel to each other, to merge at some large distance from the telescope system, perhaps at the object(s) being imaged, practically at infinity.

This FOV switch is very simple, requiring just one or two flat mirrors (two mirrors 60, 70 in FIG. 1), only one of which (70) is a moving mirror. Since the switch uses mirrors, the chromatic aberration is low, and hence the same bypass can be used for all sensor wavelengths with a common, shared bypass aperture (110W) for all sensors (145) in WFOV operation.

Some embodiments use multiple fold mirrors in the bypass path. For example the mirror 60 can be a fold mirror that can move to adjust the bypass path. However, in some embodiments, mirror 60 does not move when switching between the bypass and the NFOV path.

Some embodiments provide additional optical paths, disjoint upstream of respective merging points. The merging points are located downstream of the telescope, possibly before the sensor subsystem. Different optical paths may differ in optical power, to provide different magnifications (including possibly one or more de-magnification paths).

Some embodiments improve the sensor image quality for at least one sensor by using re-imaging optics, i.e. optics that forms not just an image for the sensor's focal plane (310) but also an intermediate image before the focal plane. The image quality is improved by providing a field stop (324) at the intermediate image, e.g. a rectangular or circular frame around the intermediate image, to act as a field stop rejecting stray light, i.e. light which is not essential to form an image at the sensor focal plane (310) and which may cause image degradation. This field stop can also be used to restrict the FOV.

Because the frame (324) is at the intermediate image, the frame, acting as a field stop, provides a real and accessible pupil. Some embodiments include another real bounding frame (350) at the location of the intermediate pupil. This bounding frame will act as an aperture-stop. This aperture stop can even be a variable iris. This aperture stop controls the size (or extent of use) of all elements that are near the large entrance pupil, such as the elements near window 110N or primary mirror 115. Window 110N and primary mirror 115 are near the entrance pupil, and can be made as large as possible to collect as much light as possible. If for some reason it is desired to restrict the size of the aperture use at window 110N or mirror 115, for a specific sensor 145, on that front window/primary, then this intermediate pupil (350) of that specific sensor 145 can provide a separate aperture size for the respective wavelength path. In this way, for every sensor path where a relay optics is used to form an intermediate image and intermediate pupil, both the field of view size and the aperture size can be separately controlled.

This means that each separate sensor 145 may be able to use a different aperture across the full size of the primary 115. In an exemplary embodiment in which the primary 115 is 7" in diameter, some of the sensor paths may use the complete size of the primary 115, such as done in some embodiments for MWIR (mid wave IR) sensor, which uses all 7" of the primary 115, and some of the other sensor paths may use less than the full primary size, as may be done for an EO sensor which only uses 5".

The re-imaging optics 320 of a sensor 145 may form an intermediate image (at 324) and also form an intermediate pupil (at 350). Field-stop frame 324 can be placed at that intermediate image, and aperture-stop 350 can be placed at the intermediate pupil. That pairing sequence of image (at 324) then pupil (at 350) then image (at focal plane 310) is, in some embodiments, a repeat of the sequence that happens up in the reflective telescope, starting with an entrance pupil, then forming an intermediate image at 135, then having a smaller, de-magnified exit pupil at 130. So down inside the refractive relay optics 320, the imaging sequence may be viewed as starting at the pupil 130 of the reflective telescope, then forming an intermediate image at 324, then having an additional intermediate pupil 350, and then forming the final image at the focal plane sensor/transducer 310.

Figure 3:
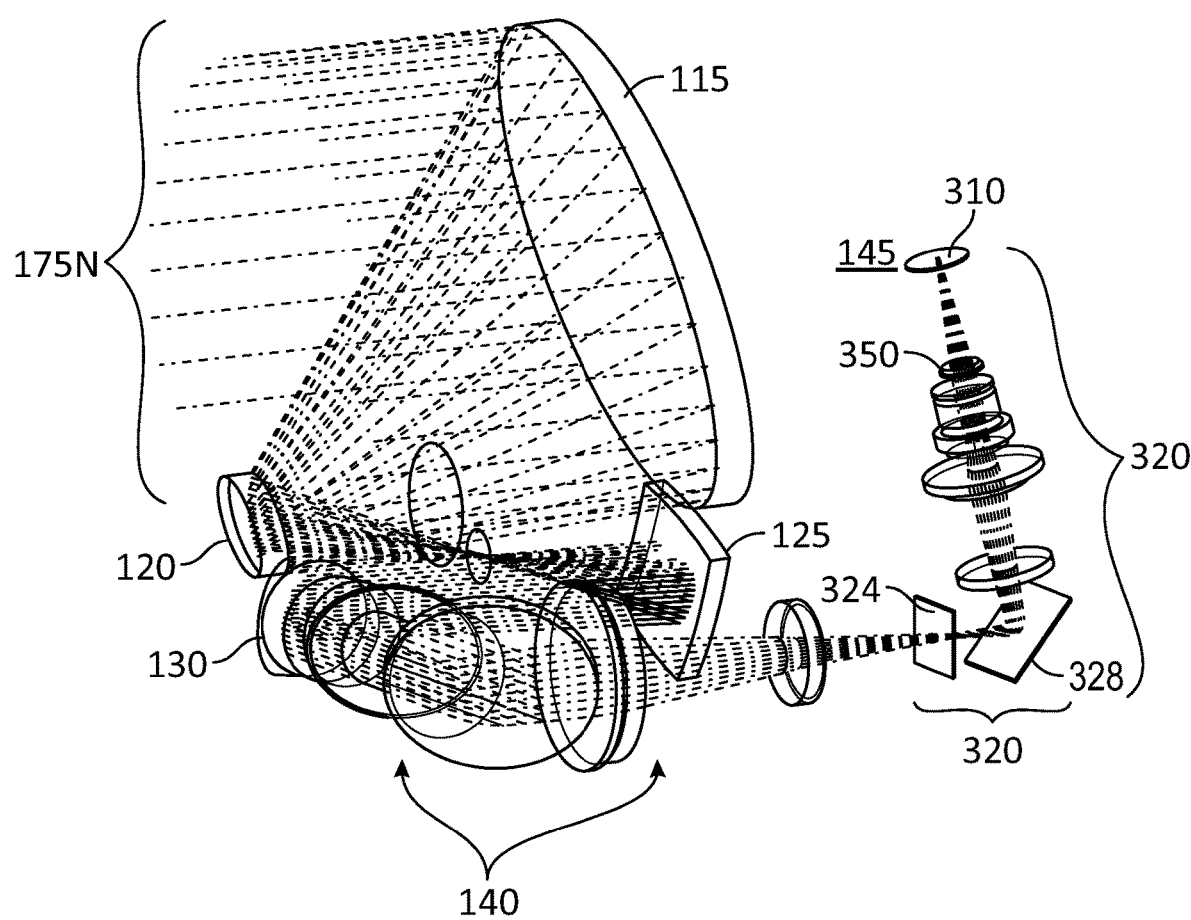
FIG. 3 illustrates various features of an exemplary optical system with re-imaging optics and a field-stop at an intermediate image according to embodiments of the present disclosure.

In the case of a cooled focal plane (310), for an IR sensor for example, e.g. a cooled mid wave IR (MWIR) sensor, the intermediate-pupil aperture-stop (350) can actually be placed within the cooled dewar space, to be a real "cold stop". FIG. 3 shows an example suitable for such MWIR sensor.

In the case of a visible light sensor (electrooptical converter or "EO"), which may have one or more focal planes in the sensor optics, that small intermediate-pupil aperture-stop 350 may be an iris that can be opened and closed for light gathering control. In some embodiments, for some system considerations and aperture performance reasons, this iris aperture-stop can be used to reduce the used area of the larger primary mirror (115) of the reflective telescope. For example, some TMA embodiments have a 170 mm (7") diameter available on the primary mirror, but a visible sensor may use only 130 mm of the primary.

Providing such controlled pupil based on the controlled aperture in the refractive optics helps ensure that the refractive telescope does not run off any of the mirrors in the reflective telescope, i.e. the refractive telescope will only collect radiation provided by the reflective telescope mirrors. The vignetting effect can be reduced or eliminated.

The features described above can be combined or used separately or in any sub-combination. For example, some embodiments include a telescope bypass path as described above but do not include re-imaging optics or do not place a frame at the intermediate image. Other embodiments use re-imaging optics and a frame at the intermediate image but not a bypass. Intermediate-image frames may be used with some but not all sensors. Some embodiments have only one sensor. The invention is not limited to TMA, gimbals, reflective or refractive optics, aerial surveillance, or other particulars, except as defined by the appended claims.

FIG. 1 illustrates an exemplary embodiment of an optical system 100 of the present invention. This embodiment is a compact sensor ball with a TMA and a bypass path. The TMA and the sensors can be packed in a gimbal to have small dimensions and low weight as suitable for aerial surveillance and other applications.

FIG. 1 shows an off-axis (non-rotationally symmetric) telescope. Other embodiments use an on-axis (i.e. rotationally symmetric) telescope. In an on-axis telescope, an optical axis of a primary mirror may be obstructed by a secondary mirror, tertiary mirror, quaternary mirror, and/or other mirrors. In contrast, in an off-axis telescope, an optical axis of each mirror of the telescope is not obstructed, or less obstructed, by any other mirror.

The on-axis telescopes may be based on a Cassegrain, Ritchey-Chretien, Gregorian, or Maksutov design, among others. On-axis telescopes may have a central obscuration. An off-axis telescope may be based on an off-axis three-mirror-anastigmat (TMA) design (shown in FIG. 1), among other possible off-axis designs. In some cases, the use of an off-axis telescope may allow central obscuration to be avoided. However, in some cases, off-axis telescopes may be more difficult to align and assemble than on-axis telescopes.

Some embodiments do not require all the components shown in FIG. 1, and/or may include additional components. Variations in the arrangement and type of the components may be made without departing from the spirit or scope of the claims as set forth herein. Additional, fewer, and/or different components may be provided.

The optical system 100 includes a housing 105, an input collecting aperture 110N, a primary mirror 115, a secondary mirror 120, a tertiary mirror 125, and an exit pupil 130 of the reflective telescope. The aperture 110N may be, or may include, a window recessed into the housing 105. In the NFOV optical path, electromagnetic (EM) radiation may enter (e.g., couple into) the housing 105 via the aperture 110N and be relayed to the exit pupil 130 via the mirrors 115, 120, and 125. In this regard, the mirrors 115, 120, and 125 may include an optical surface for reflecting EM radiation incident on a surface of the mirrors 115, 120, and 125. The term "EM radiation" may generally refer to any EM spectrum, and is synonymous with the term "light" as used herein. Thus, the term "light" is not limited to visible light.

The optical system 100 also includes a bypass path for use with medium or wide field of view (MWFOV, also denoted WFOV). The term "medium field of view" may be used to distinguish the bypass path from other paths with still wider FOVs. For example, a separate camera can be provided, possibly attached to housing 105 on the outside of the housing, to provide a bypass with a wider FOV than the bypass path inside the housing 105.

The MWFOV path using optics inside the housing 105 includes an input collecting aperture 110W, a bypass mirror 60, and an insert fold mirror 70 operated by a motor, e.g. a servo motor (not shown in FIG. 1; note servo motor 74 in FIGS. 4 and 5A) based on instructions from controller 72. In MWFOV operation, fold mirror 70 blocks the NFOV path between tertiary mirror 125 and exit pupil 130 and relays the bypass EM radiation from MWFOV aperture 110W to exit pupil 130. The optical path emerging from mirror 70 to exit pupil 130 in MWFOV mode is parallel to, and may spatially coincide with, the path from the merging point to exit pupil 130 in NFOV mode. Any one of the two paths may be wider than, and may spatially contain, the other one of the two paths. In some embodiments, the two paths partially overlap, with neither path containing the other path.

In NFOV mode, fold mirror 70 unblocks the NFOV path and blocks the bypass path, possibly reflecting the bypass beam back to mirror 60 and then outside of bypass aperture 110W. In some embodiments, fold mirror 70 is positioned below the optical path from secondary mirror 120 to tertiary mirror 125.

Like NFOV aperture 110N, MWFOV aperture 110W may include a window recessed into the housing 105. Electromagnetic (EM) radiation may enter (e.g., couple into) the housing 105 via the aperture 110W and be directed to the exit pupil 130 via the mirrors 60 and 70. The NFOV and MWFOV paths have overlapping linear FOVs at a distance above a few feet from housing 105, with NFOV being within the MWFOV except within a few feet from housing 105.

Mirrors 60 and 70 may include an optical surface for reflecting EM radiation incident on their surface. The WFOV path may transmit the same or different spectrum than the NFOV path.

In an embodiment, the mirrors 60, 70, 115, 120, and 125 may be formed of the same material; possible materials are described in the aforementioned U.S. Pat. No. 10,732,378, incorporated herein by reference.

The apertures 110W, 110N may be round, circular, substantially circular, oval, substantially oval, or another shape. Some embodiments include a frame around exit pupil 130, to have an aperture at exit pupil 130 and control the aperture and light collection by the telescope. Other embodiments do not have an aperture at exit pupil 130, but rather place fold mirrors or beamsplitters at the pupil location because the telescope exit rays are most compact at the pupil location so the mirrors and beamsplitters can be of minimal size. If an aperture is placed at pupil 130, the aperture can be of any suitable shape.

In an embodiment, such as shown in FIG. 1, the aperture 110N may be larger than the apertures 110W and pupil 130. For example, for circular (or substantially circular) collecting apertures, the aperture 110N may be about 6 inches to about 8 inches in diameter, and/or the apertures 110W and pupil 130 may each be about 0.5 inches to about 2 inches. The aperture 110W and pupil 130 may or may not be of equal size. An image captured by the aperture 110N may be magnified based on a size difference (e.g., surface area difference of reflective mirror surface) between the aperture 110N and pupil 130 (e.g., a larger size difference is associated with higher magnification), with the magnified image being output at the pupil 130. Mirrors 60 and 70 may be flat, having no optical power. An image captured by the aperture 110W may reach the pupil 130 with no magnification. The size of aperture 110W may be selected as a maximum size such that the image captured by the aperture would fit in pupil 130. Such size relations are not limiting.

As shown in FIG. 1, an input beam 175N enters the housing 105 via the aperture 110N. The beam 175N may traverse from the aperture 110N to the mirror 115. The mirror 115 may reflect (e.g., pass, relay) the beam 175N to the mirror 120. The mirror 120 may reflect the beam 175N to the mirror 125. In some cases, the beam 175N reflected by the mirror 120 may pass through a focus 135 of the mirror 120, where the focus 135 is between the mirror 120 and the mirror 125. The mirror 125 may reflect the beam to the pupil 130. In this regard, in FIG. 1, the NFOV optical path is a path that the beam 175N takes in traversing through the optical system 100 and includes a path from the aperture 110N to the mirror 115, a path from the mirror 115 to the mirror 120, a path from the mirror 120 to the mirror 125, and a path from the mirror 125 to the pupil 130.

Figure 2:
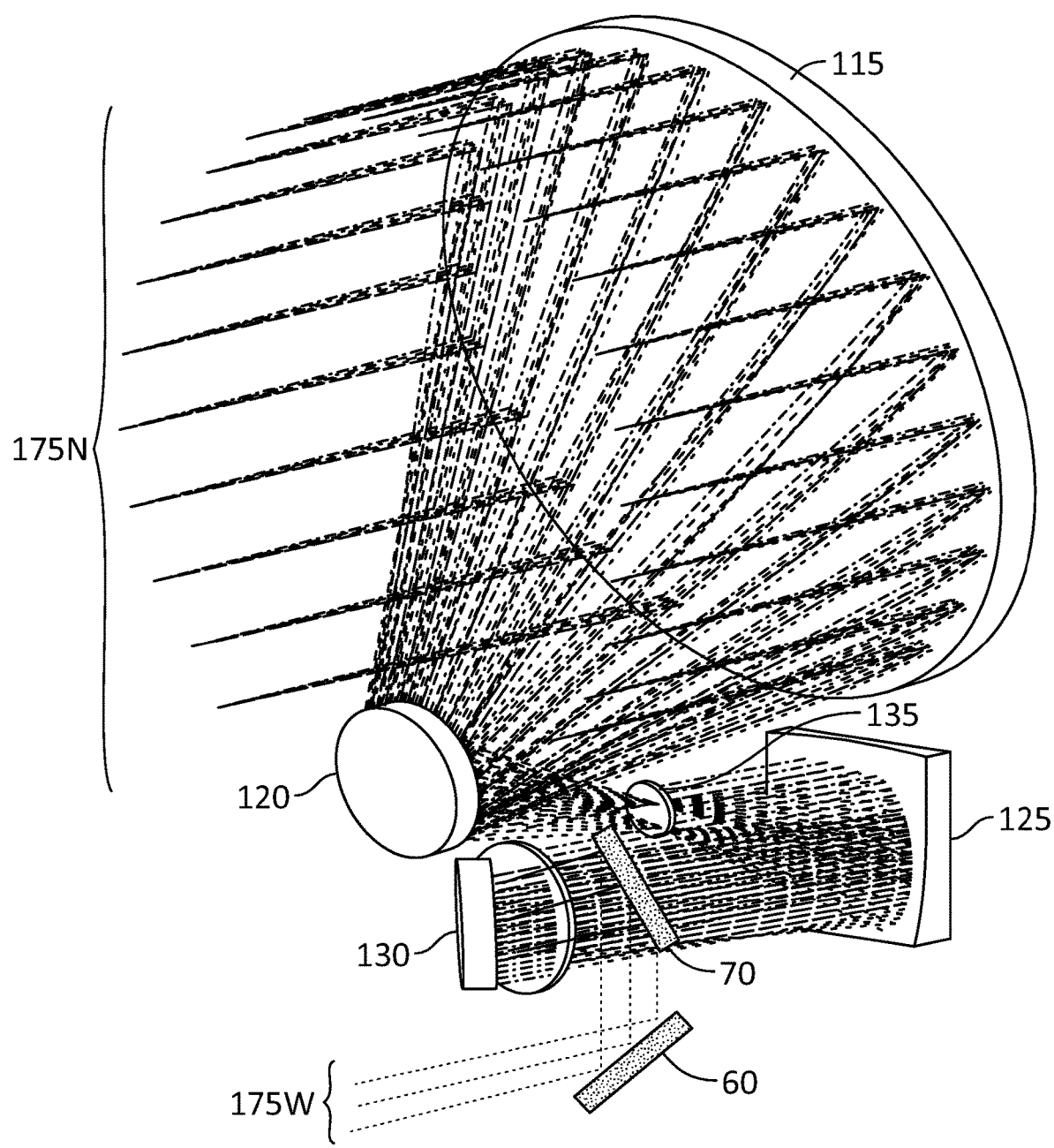

FIG. 2 illustrates a perspective view of the mirrors 115, 120, and 125 and pupil 130 that form part of the optical system 100 in accordance with an embodiment of the present disclosure. Mirrors 60 and 70 are also schematically shown.

Also shown in FIG. 1 is an input beam 175W entering the housing 105 via the aperture 110W for MWFOV imaging. The beam 175W may traverse from the aperture 110W to the mirror 60. The mirror 60 may reflect the beam 175W to fold mirror 70. The mirror 70 may reflect the beam 175W to the pupil 130. The MWFOV optical bypass path is a path that the beam 175W takes in traversing through the optical system 100 and includes a path from the aperture 110W to the mirror 60, a path from the mirror 60 to the mirror 70, and a path from the mirror 70 to the pupil 130.

In some embodiments, both the NFOV beam emerging from TMA mirror 125 toward pupil 130, and the bypass beam emerging from mirror 70 to pupil 130, are afocal, collimated bundles. Therefore the same optics downstream of the merging point (at mirror 70) can process both the NFOV and bypass beams.

In an embodiment, optical paths of the optical system 100 may further include paths from the pupil 130 to one or more additional processors and/or sensors. As an example, in FIG. 1, the optical paths of the optical system 100 may include the paths from the pupil 130 to one or more beamsplitters 140 and sensors 145 (sensors 145A, 145B, 145C, and 145D). The beamsplitters 140 may be, or may include, dichroic beamsplitters. The sensors 145 may be associated with different wavelength ranges. By way of non-limiting example, the sensors 145 may be, or may include, one or more of a visible light sensor, a short-wave infrared (IR) sensor, a mid-wave IR sensor, a low-light sensor, and/or other sensors. In an embodiment, one or more of the sensors 145 may be part of a camera. It is noted that, although four sensors are shown in the optical system 100, fewer, more, and/or different sensors may be utilized. Although in FIG. 1 the housing 105 of the optical system 100 includes the beamsplitters 140 and sensors 145, one or more of the beamsplitters 140 and/or the sensors 145 may be external to the housing 105 in other cases.

The system 100 includes a controller 72, e.g. a software programmed computer processor or a non-programmable controller, that controls the fold mirror 70 and other parts of the system, e.g. the sensors. Controller 72 may or may not be inside the housing 105. In some embodiments, controller 72 is partly inside and partly outside of housing 105. The controller parts within housing 105 may communicate with computers or other equipment (not shown) outside the housing 105 via electrical and/or wireless connections, to receive commands or operating parameters from outside the housing and to provide data from sensors or other equipment to computers or other devices outside the housing.

In an aspect, the beamsplitters 140 may include one or more beamsplitters for splitting incident beams and providing (e.g., directing) these split portions of the incident beams to one or more of the sensors 145. The beamsplitters 140 may split an incident beam into spectrally distinct beams (e.g., beams of different, overlapping or non-overlapping, wavelength ranges). The beamsplitters 140 may include a beamsplitter that splits an incident beam into a first beam directed to one of the sensors 145 and a second beam directed to another one of the sensors 145. For example, the first beam may be directed to the sensor 145A (e.g., a visible light sensor) and the second beam may be directed to the sensor 145B (e.g., a short-wave IR sensor). In some cases, the beamsplitters 140 may include beamsplitters in series. For example, a first beamsplitter may split an incident beam into a first beam directed to the sensor 145C and a second beam. A second beamsplitter may direct a portion of the second beam to the sensor 145A and another portion of the second beam to the sensor 145B.

In some cases, relay optics (not shown) may be utilized to direct a beam from the pupil 130 to the beamsplitters 140 and/or direct a beam from the beamsplitters 140 to one or more of the sensors 145. Relay optics may include lenses, mirrors, beamsplitters, beam couplers, prisms, or generally any optical elements that may be utilized to help direct a beam along or toward a desired direction. For example, a first set of relay optics may direct a beam from the pupil 130 to the beamsplitters 140 and/or a second set of relay optics may direct a beam from the beamsplitters 140 to some (e.g., at least one) of the sensors 145. In some cases, the beamsplitters 140 may provide an output beam to some of the sensors 145 without any intervening relay optics. The term "beamsplitters", as used herein, may include the relay optics.

In FIG. 1, the incoming beams at apertures 110N, 110W are depicted as parallel (collimated) rays of EM radiation. Other rays may enter the housing 105 (e.g., via the aperture 110N) aside from those rays shown in FIG. 1. The term "collimated light" indicates collimated bundles of light. Each collimated bundle enters the aperture 110N or 110W from a single object point, and converges into a respective point in each sensor plane 310 (FIG. 3). Different bundles come from different object points, and are not necessarily parallel to each other.

In an embodiment, the optical system 100 may be engaged with, attached to, and/or mounted on a platform 165 (e.g., a mounting platform). In FIG. 1, an upper portion of the housing 105 is engaged to the platform 165 via an engagement 170. For example, the platform 165 may be a platform of a vehicle that facilitates transportation and/or rotation of the optical system 100. The vehicle may be a ground vehicle (e.g., automobile), maritime vehicle, or aerial vehicle (e.g., manned or unmanned aerial vehicle). As another example, the platform 165 may be a tripod, an optical system mount (e.g., a telescope mount), or generally any platform onto which the optical system 100 may be mounted. In some cases, the housing 105 may be rotatably engaged to the platform 165, such that the optical system 100 can be rotated relative to the platform 165 about one or more axes, e.g. to allow adjustment of the field of view of the optical system 100. In an aspect, the engagement 170 may be mechanical, electrical, and/or magnetic in nature.

Optical system 100 may include fewer mirrors or more mirrors than shown in FIG. 1, and the mirrors may be in a different arrangement than in FIG. 1. The optical system 100 may include additional components, such as optics (e.g., mirrors, lenses, beamsplitters), processors, and/or sensors, not shown in FIG. 1. For example, the optical system 100 may include one or more additional mirrors, input collecting apertures, and output collecting apertures (not shown in FIG. 1) that capture and relay EM radiation. The additional input collecting apertures may each have a respective field of view, capture EM radiation from its field of view, and couple the captured EM radiation or portion thereof to one or more sensors via the output collecting apertures.

In the off-axis assembly of FIG. 1, the optical paths between any two of the mirrors 115, 120, and 125 are not obstructed by any other of the mirrors 115, 120, and 125, or by mirrors 60 and 70.

FIG. 3 is a perspective view showing only the NFOV path and only one sensor 145. Multiple sensors can be present. Beamsplitter optics 140 includes dichroic polarizers, mirrors, and possibly other optics as described above. A sensor's image plane (focal plane) is shown at 310. Some of the sensor's optics downstream of beamsplitters 140 is shown at 320. The beamsplitters 140 and/or optics 320 may form an intermediate image at a point 324, where the beam is collimated. A frame, e.g. rectangular or circular or some other shape, may be provided at point 324 and sized to reject stray light, thus reducing noise and improving image quality. The frame (field stop) 324 forms a real and accessible pupil 350. Optics 320 may include an aperture-stop at intermediate pupil 350. In some embodiments, the image size at point 324 is equal or about equal to the image size at the sensor's transducer at focal plane 310. In some embodiments, the frame 324 is before a prism 328, with no optical elements therebetween.

Figure 4:
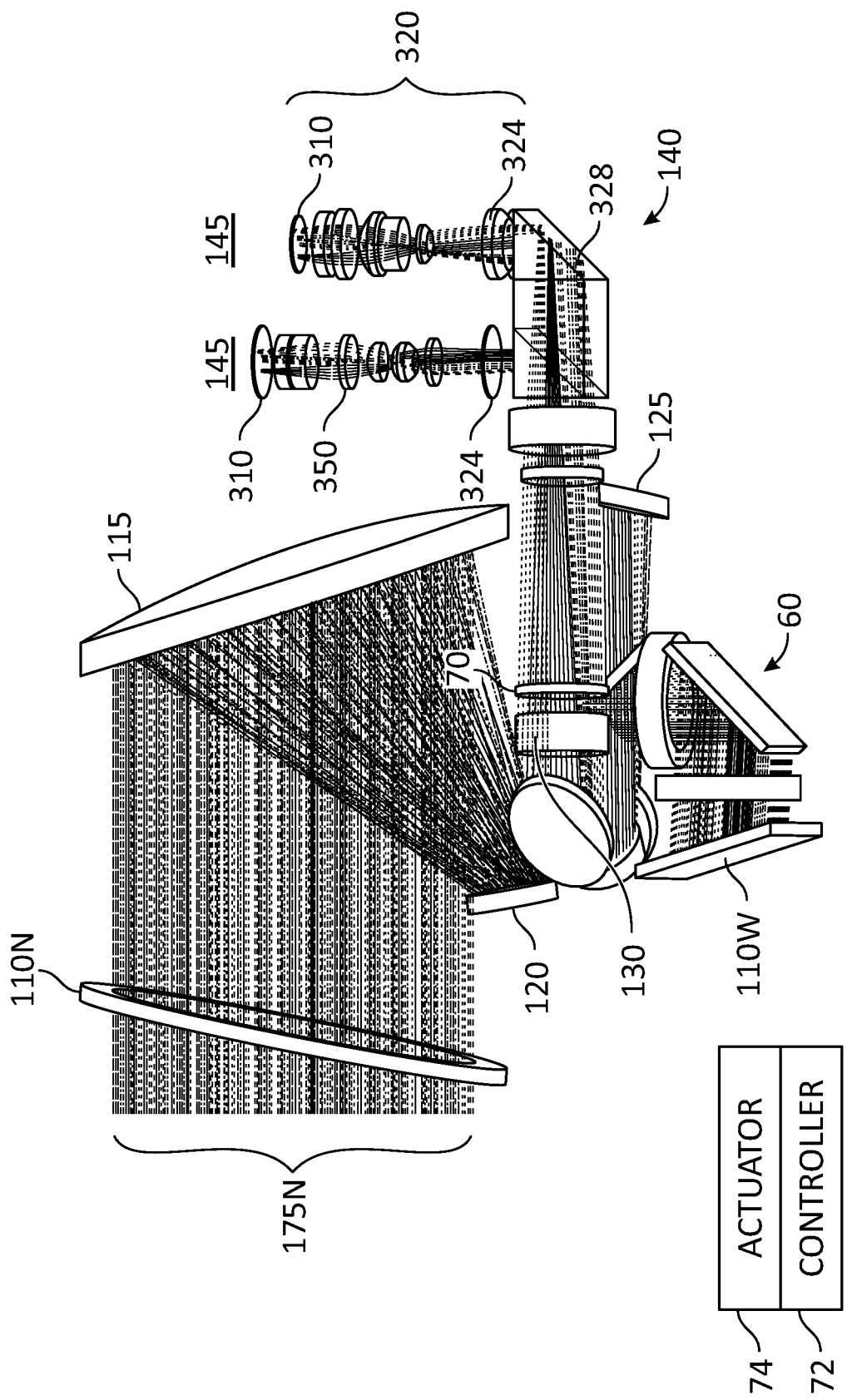
FIGS. 4, 5A illustrate various features of exemplary optical systems with a FOV switch and re-imaging optics according to embodiments of the present disclosure.

FIG. 4 is a side view showing the MWFOV path having multiple fixed flat mirrors 60 and a single fold mirror 70. The fold mirror position is controlled by servo motor 74 (shown schematically as a block) based on commands from controller 72. FIG. 4 shows two sensors 145, with their intermediate-image frames 324.

Figure 5A:
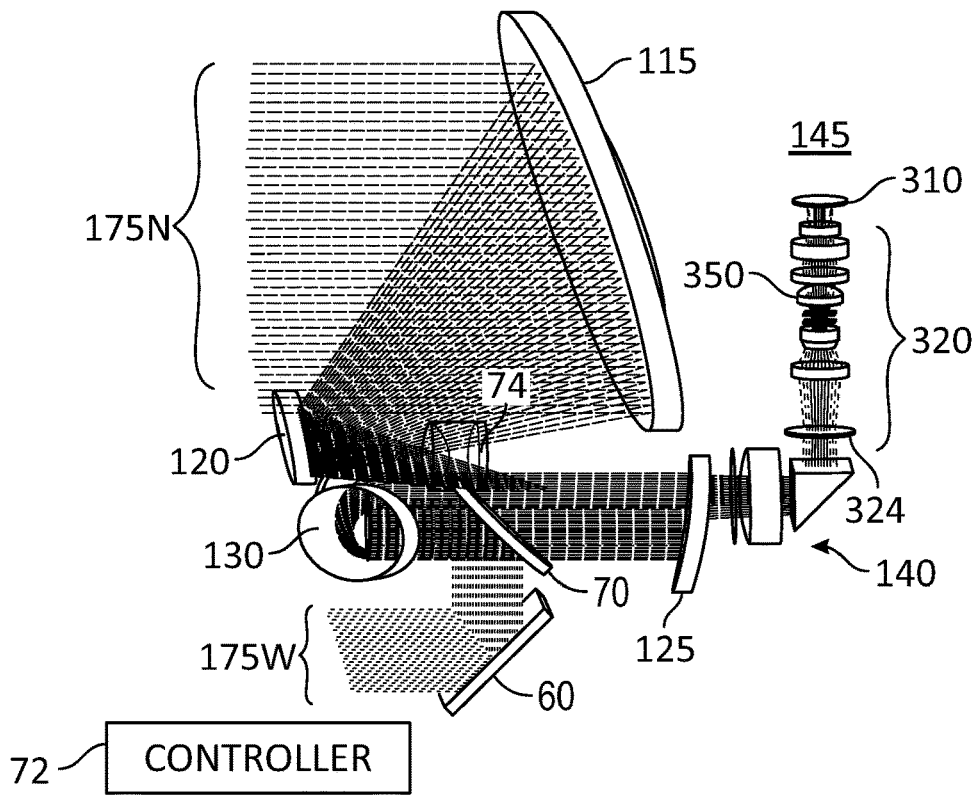
Figure 5B:
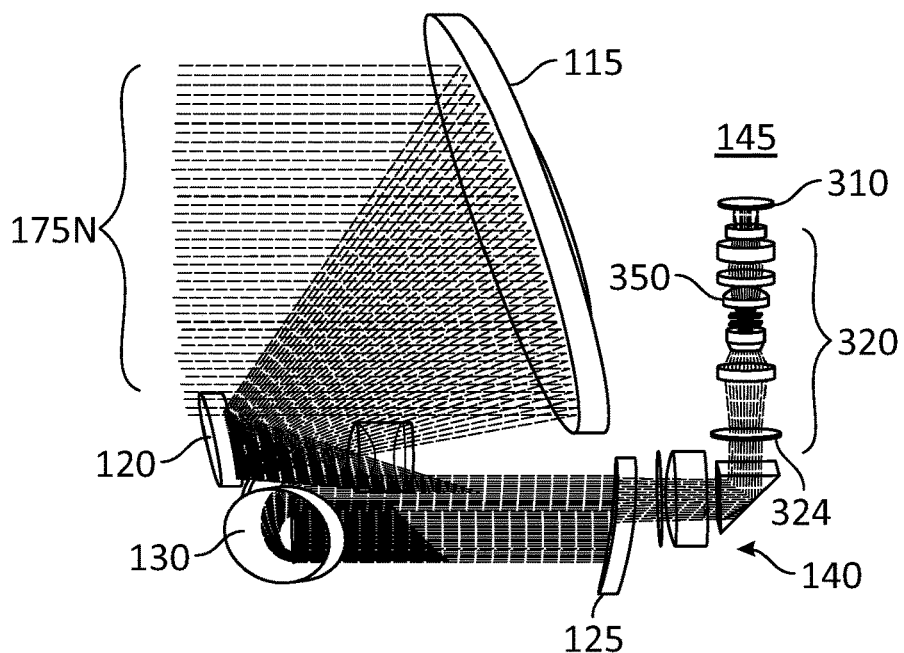
FIG. 5B illustrates the narrow field of view (NFOV) path of the system of FIG. 5A.
Figure 5C:
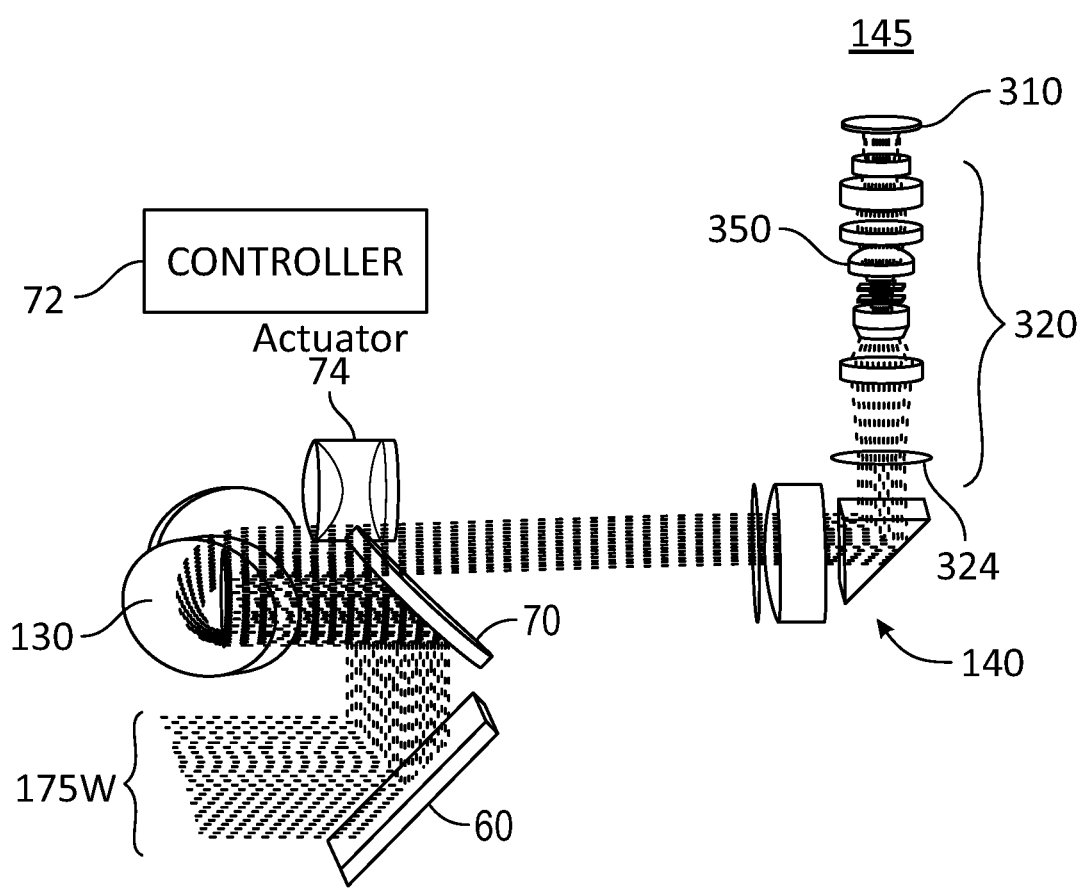
FIG. 5C illustrates the wide field of view (WFOV) path of the system of FIG. 5A.

FIG. 5A is a side view of a system 100. FIG. 5B illustrates the NFOV path of the system of FIG. 5A. FIG. 5C illustrates the WFOV path of the system of FIG. 5A.

Figure 6:
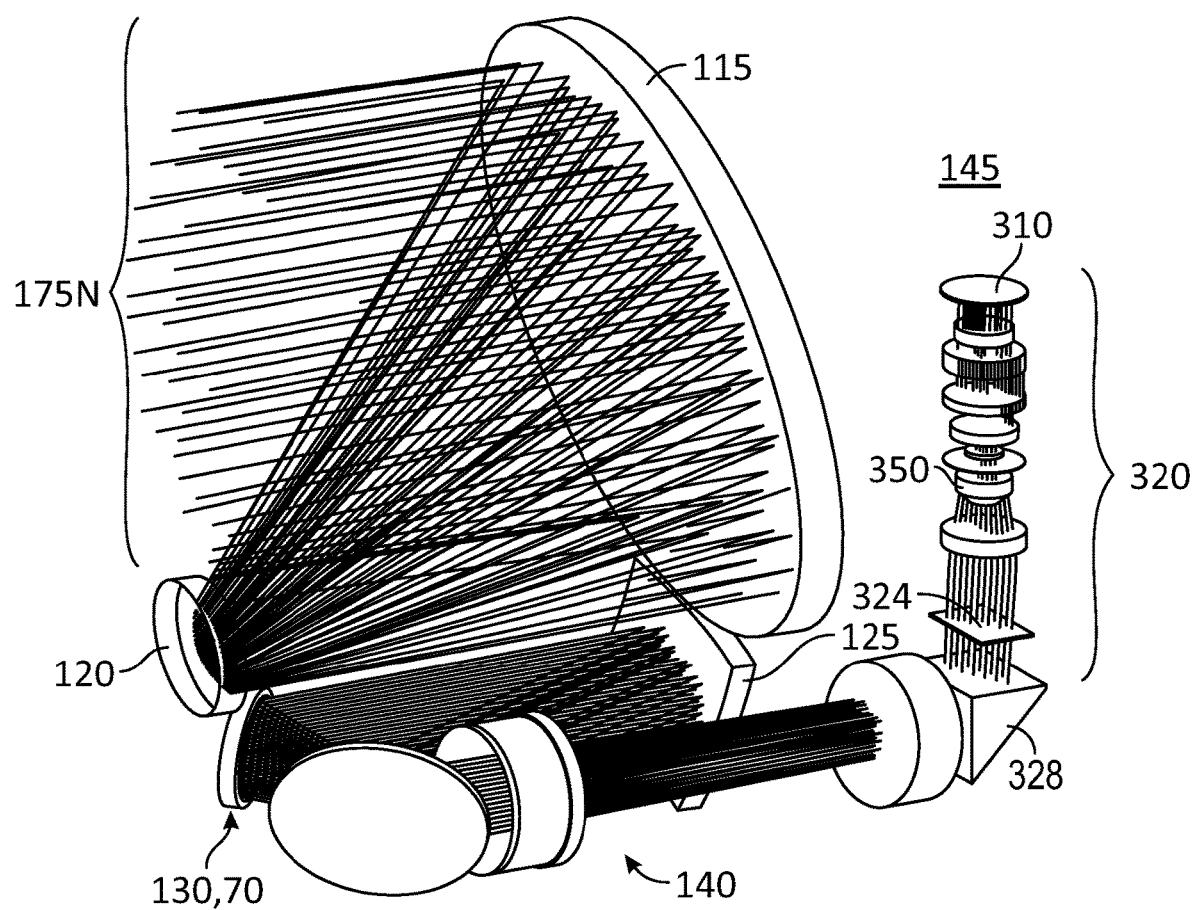
FIGS. 6, 7A illustrate various features of exemplary optical systems with a FOV switch and re-imaging optics according to embodiments of the present disclosure.

FIG. 6 is another NFOV path embodiment with a larger view of the relay optics with a rectangular frame 324 at the intermediate image, and a donut-opening frame 350 at the intermediate pupil. Right-angle prism 328 is also shown.

Figure 7A:
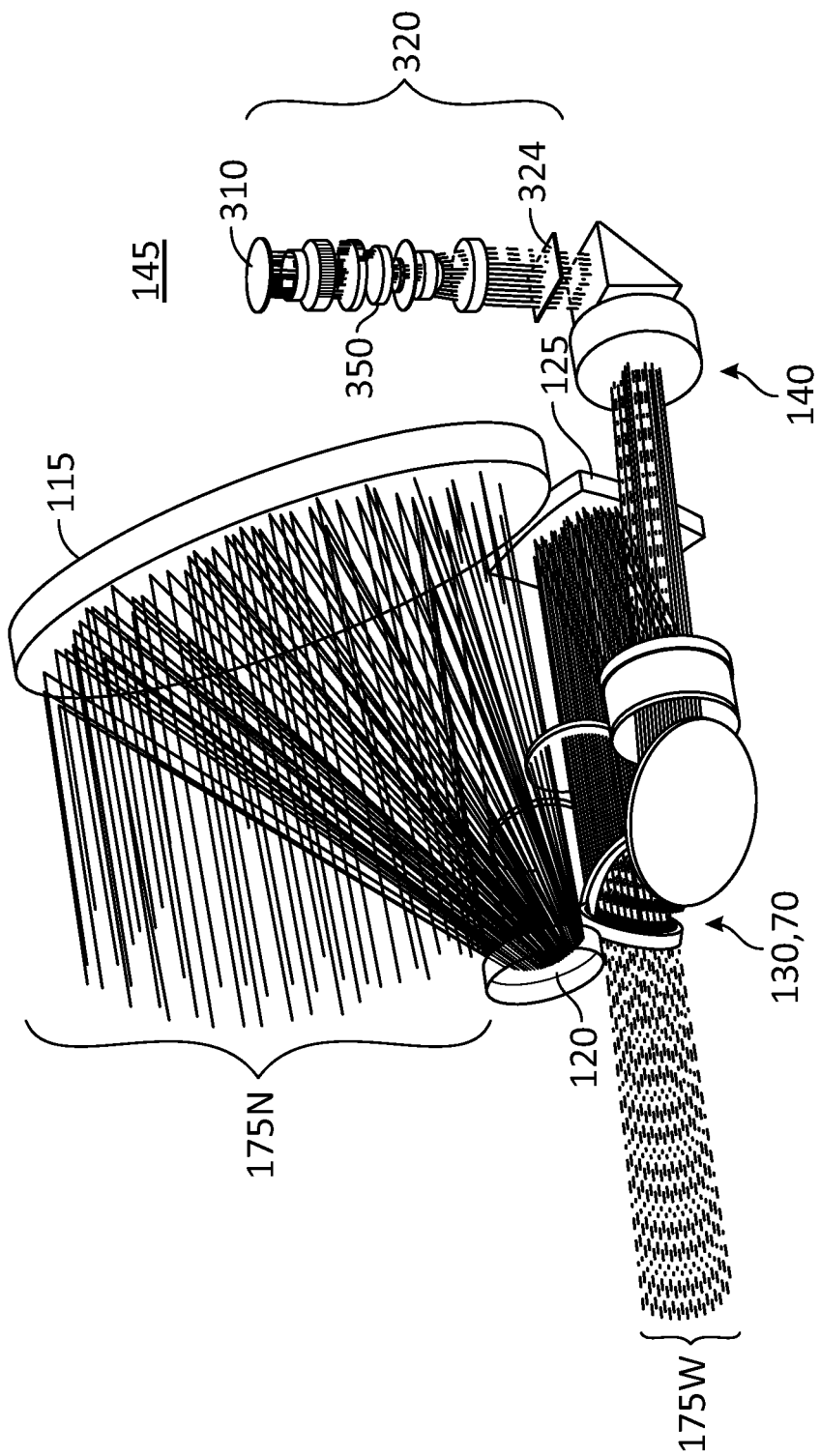
Figure 7B:
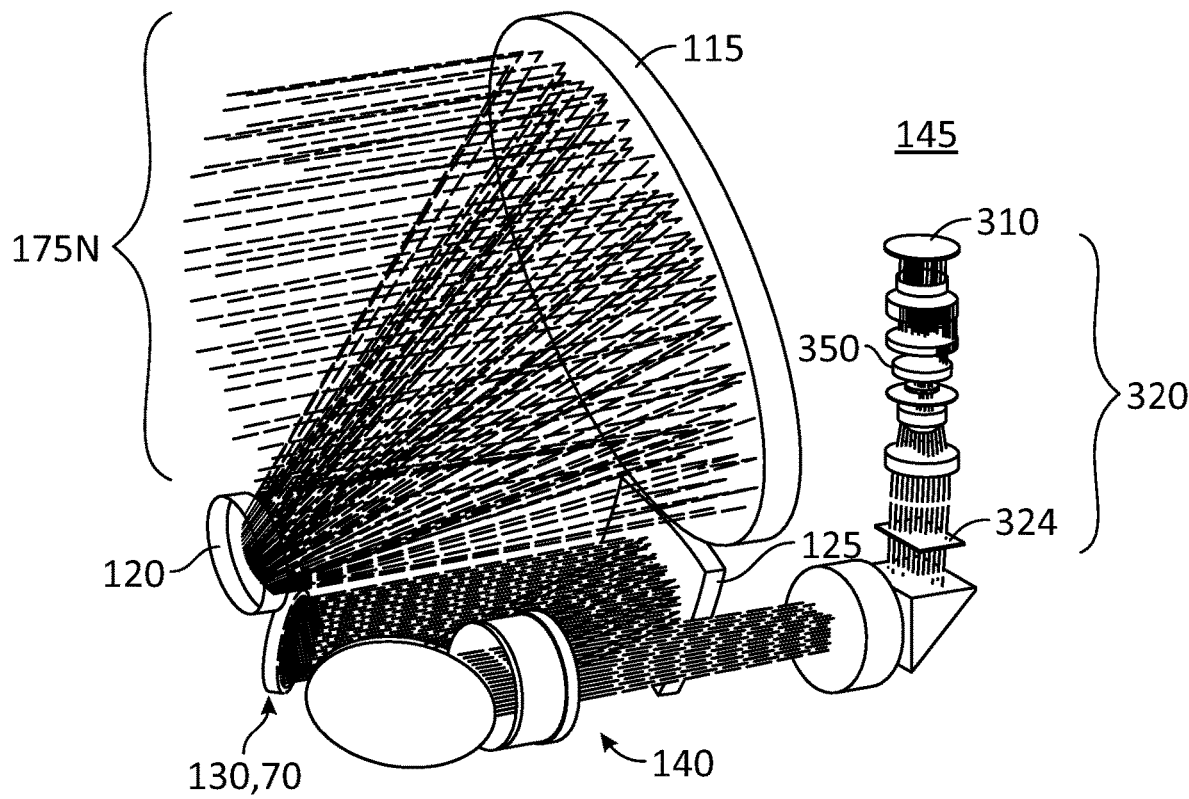
FIG. 7B illustrates the narrow field of view (NFOV) path of the system of FIG. 7A.
Figure 7C:
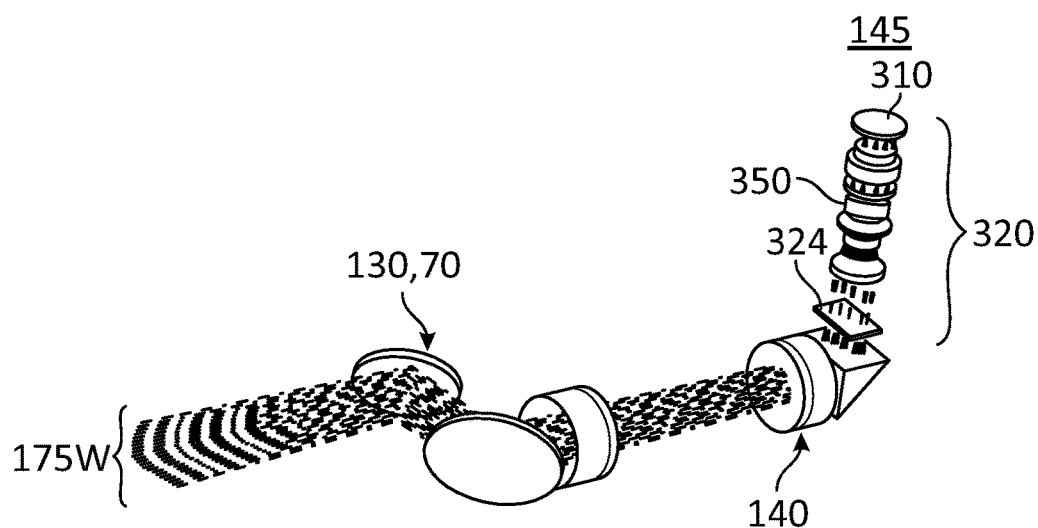
FIG. 7C illustrates the wide field of view (WFOV) path of the system of FIG. 7A.

FIG. 7A is a side view of a system 100. FIG. 7B illustrates the NFOV path of the system of FIG. 7A. FIG. 7C illustrates the WFOV path of the system of FIG. 7A.

FIGS. 6, 7A, 7B, 7C illustrate embodiments with a mirror positioned at exit pupil 130. In these embodiments, mirror 60 is omitted. The bypass switch uses only one mirror 70, with two-position articulation. In one position, for the narrow field of view, the mirror 70 directs the incoming rays from the telescope and passes them on to the sensor optical subsystem for all the narrow fields of view (for all sensors). In the other position of mirror 70, the telescope is bypassed, and MWFOV is obtained.

In these implementations, beamsplitter/mirror optics 140 turns the NFOV path around, so the sensors' individual optics 320 are behind the telescope mirrors. The entire package is compact, and can be gimballed with rotation in at least two axes, with stabilization servo control on each moving axis as known in the art. The reflective telescope may have a large aperture 110N, and may work equally well for all wavelengths, so the large aperture 110N is shared by all the different wavelength sensors 145 in the system.

After the pupil 130, each distinct wavelength range can be separated from other wavelength ranges by a beamsplitting surface 140 (either on a plate or in a prism-cube). The separated paths are coupled to the sensors. A sensor 145 may have optics 320 (e.g. refractive optics) that couples the sensor's wavelengths to the sensor's transducer 310 in the sensor's image plane.

In some implementations of the embodiments discussed above and below, the reflective telescope is a common TMA telescope of afocal form, so that each of the beamsplitter elements deals with collimated light. This allows for the simplest and most efficient design of each dichroic, beamsplitting coating.

Further, some implementations of the embodiments discussed above and below, the primary mirror 115 is a large concave mirror. The TMA also has smaller convex secondary mirror 120, and similarly small concave tertiary mirror 125. The TMA is afocal: it receives collimated light at primary 115, and outputs collimated light at tertiary 125. The off-axis design reduces or avoids central obscuration. An intermediary image is formed at point 135 between the secondary 120 and tertiary 125. The entrance pupil is located in front of the primary 115, conveniently near the front cover window 110N; and for each sensor 145, the exit pupil is formed in image plane 310 by optics 320, possibly using field stop 324 positioned at an intermediate image. The sensor receives collimated light from the beamsplitters. In some embodiments, the beam at each frame 324 is collimated.

The exit pupil 350, formed by frame 324, is clear and accessible, to allow real framing with a physical aperture or iris 350 to allow for control of stray light and carefully defined used area on each of the mirrors 115, 120, 125, 60, 70, and front cover windows 110N and 110W.

Positions near the exit pupil 130 make a convenient place for fold mirrors or beam splitter elements (plates or prism-cubes), because the light is of known, controlled size at those positions and can minimize the size of the fold mirrors.

In some embodiments, the magnification from the front collimated pupil at aperture 110N to the exit pupil at pupil 130 is between 3× and 8×. This means that the front cover window 110N and the entrance pupil will be 3 to 8 times larger as viewed from the sensors than all elements downstream of the magnifying TMA. Hence, the field of view in object space is relatively small, for example 1 or 2 degrees across.

If the object space field of view (NFOV) is 1 degree, and the telescope magnification is 6×, then the field angle down inside the telescope, at the exit pupil 130 of the telescope, will be 6 degrees.

The large reflective TMA telescope, and the sharing of apertures 110N and 110W by all sensors, makes for efficient and compact packaging within a sensor ball. In some embodiments, the compact system is provided, with primary aperture 110N that is almost half the size of the entire sensor ball. The system can also be compact both in depth and in height.

For example, some embodiments have telescope apertures 110N that are as large as ⅓ to ½ of the total outer ball size. The ball can be 16" (16 inches, or 406 mm) in diameter and the aperture 110N can be 7" diameter.

The depth of the telescope is driven by the distance between the primary 115 and the secondary 120. (The depth of the tertiary 125 to the secondary can be very close to that of the primary-to-secondary). One embodiment has the entrance pupil on the primary that is 7 inches, and the distance to the secondary is only 5.5 inches. This means, the ratio of the depth-to-aperture is 0.78:1. This keeps the large telescope aperture 110N close to the front cover of the ball, without intruding into the ball as deep as the aperture would indicate. A telescope with ratio of P-S (primary-to-secondary) depth-to-aperture of as much as 1:1 would still be a reasonably compact package. Any ratio larger than that, like 1.5:1 would mean that the telescope was so deep that it took up nearly the whole depth of the ball, and would leave very little room for any sensor paths to fold up along the back cover (behind the primary 115).

Similarly, the height of the telescope, from the uppermost light at the top of the primary 115, to the lowermost light at the tertiary 125, is determined by the amount of off-axis operation used for each mirror. In order for the telescope to remain unvignetted, and not have any vestige of 'central obscuration', the primary mirror 115 needs to be used far enough off-axis that the light coming to it does not get clipped by the secondary 120.

In some embodiments, with the 16" ball and the 7" primary, the total height, from the top of the primary bundle of light to the base of the tertiary bundle, is 9.13". The ratio of total height-to-aperture 110N is then 1.3:1. But the invention is not limited to the ball implementation or any specific dimensions.

In some embodiments, as mentioned above, the afocal reflective telescope has a magnification between 3× and 8×. The individual sensor paths 320 down behind the telescope are smaller in aperture and larger in field of view.

Because each wavelength range's refractive sensor path 320 works with a collimated bundle of light those paths 320 function like a medium or narrow field of view in bypass operation.

For example, in one embodiment with 6× afocal TMA magnification, in NFOV operation, a sensor 145 has optics 320 with a 1 degree field of view and a 6 inch aperture, but if the telescope is bypassed (MWFOV operation), the sensor's refractive optics 320 has a 6 degree field of view and a 1 inch aperture.

This bypass can be achieved by inserting one or two fold mirrors into the collimated light coming off of the tertiary. Mirror 60 can be a fold mirror if desired, to provide additional adjustment of the MWFOV path. In the reverse path, the inserted fold mirror 70 directs the light away from the telescope mirror parts/structure and the second mirror 60 directs that light out to object space with the same line of sight to a distant object as the telescope itself, or with the line of sight merging with the telescope line of sight at infinity or at a large distance, e.g. equal to the distance to the objects being imaged, so that the objects covered by the narrow field of view are also covered by the medium or wide field of view.

Both mirrors 60, 70 are flat, making for a very simple FOV switch, especially since the mirrors are in the shared path for all sensor wavelengths, so that the bypass has a common, shared aperture 110W, and both the bypass and the NFOV path have a shared pupil 130.

Each imaging focal plane 310 has a group of lenses 320 next to it that forms not just an image for the focal plane, but also an additional intermediate image.

At this intermediate image, a rectangular frame 324 can be placed around the intermediate image to act as a field stop and reject stray light from outside the field of view.

Also because of this re-imaging optics form, the image at frame 324 and the pupil at aperture 350 are both real and accessible and so stray light control can be done at both that intermediate image and that intermediate pupil with appropriately shaped and sized frames, such as a rectangle 324 at the image and an aperture stop or variable iris, 350 at the pupil.

If a variable iris is used, it may be controlled by a servo motor based on commands from controller 72. This controlled aperture 350, located near the focal plane 310, is then relayed up through the refractive telescope 320 and has a real pupil that may coincide with the entrance/exit pupils that exist in the TMA reflective telescope.

In the case of the cooled MWIR focal plane 310, the aperture-stop can be placed within the cooled dewar space, so the aperture-stop can be a real 'cold stop'.

In the case of the visible-light focal plane(s) 310 in the sensor optics, that small aperture-stop may have placement of an iris that can be opened and closed for light gathering control.

For some system considerations and aperture performance reasons, this iris aperture-stop can be made smaller than the full aperture extent of the large primary mirror. For example, in case of a 170 mm diameter available on the primary 115, the visible-light sensor 145 uses only 130 mm.

Placing such a controlled pupil refractive optics 320 helps ensure that in the NFOV operation the optics 320 will not get light off the mirrors in the reflective telescope.

Some sensor ball embodiments are more compact than described above. For example, in some embodiments, the ball diameter is only 11", the primary diameter is 4.3"; the P-S depth is 4.6"; and the total height is 6.5". The ratio of the primary 115 diameter to the ball diameter is 1:2.5. The depth ratio of Primary-to-Secondary distance to primary aperture 110N is 1.1:1. The ratio of the height to the primary 115 diameter is 1.5:1.

Figure 8A:
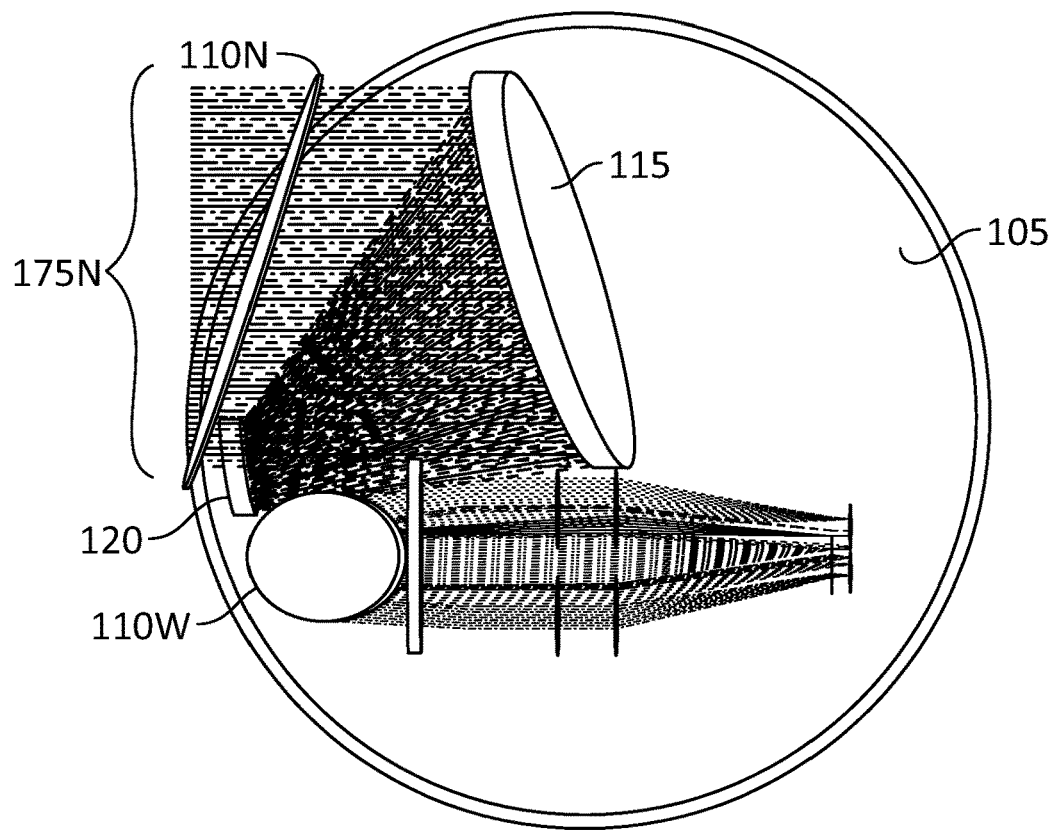
FIGS. 8A and 8B illustrate various features of an exemplary optical system with a FOV switch according to embodiments of the present disclosure.
Figure 8B:
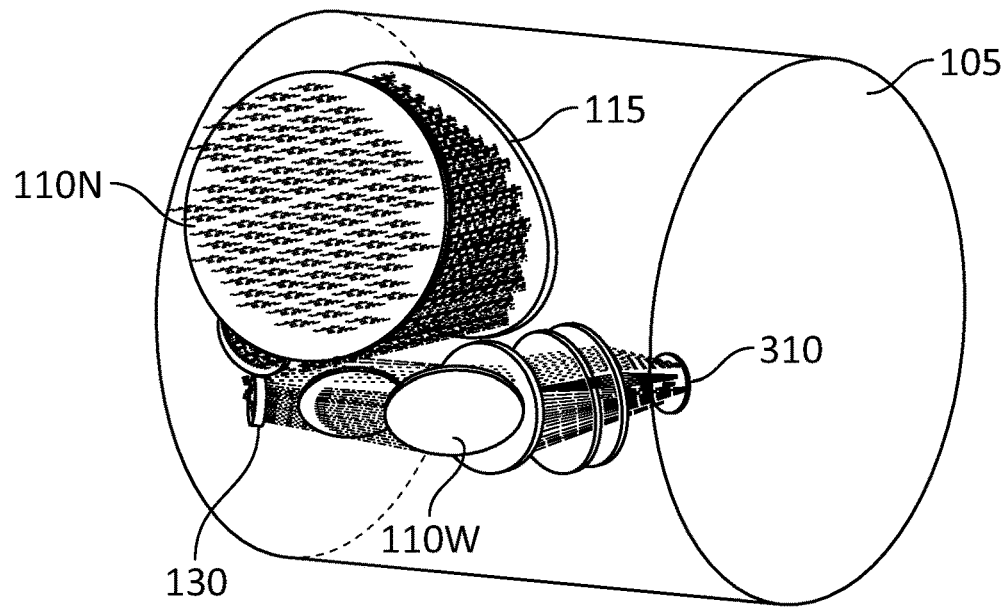

FIGS. 8A, 8B show the same optical system packed in a barrel, having 277 mm diameter (11") and 305 mm barrel height (12"). Only one refractive sensor path 320 is shown for simplicity, but multiple sensors can be present. The field of view switch is as in FIG. 1, common to all the sensors.

The description of the subject technology is provided to enable any person skilled in the art to practice the various aspects described herein. The foregoing description is not intended to limit the present disclosure to the precise forms or particular fields of use disclosed.

Embodiments described above illustrate but do not limit the subject technology. It is contemplated that various alternate embodiments and/or modifications to the subject technology, whether explicitly described or implied herein, are possible in light of the disclosure. Accordingly, the scope of the invention is defined only by the following claims.

What is claimed is:

1. A system comprising:
a sensor subsystem comprising one or more sensors configured to sense electromagnetic radiation; and
an optical subsystem defining a plurality of optical paths comprising at least a first optical path and a second optical path, each optical path being within the system, wherein each optical path is configured to carry electromagnetic radiation from an object space to the sensor subsystem, wherein:
the optical subsystem comprises a telescope, and the first optical path passes through the telescope;
the second optical path does not pass through the telescope;
the first and second optical paths merge at a merging point between the telescope and the sensor subsystem, and the first and second optical paths are disjoint upstream of the merging point, wherein a first input collecting aperture at a first location is in the first optical path and a second input collecting aperture at a second location is in the second optical path, wherein the first and second optical paths do not meet between the first or second input collecting apertures and the merging point;
a magnification provided by the second optical path at the merging point is different from a magnification provided by the first optical path at the merging point.

2. The system of claim 1, wherein the magnification provided by the second optical path at the merging point is one, wherein the merging point is between a curved tertiary mirror in the first optical path and an exit pupil of the telescope.

3. The system of claim 1, wherein the system comprises a controller configured to select any one of the first and second optical paths based on one or more instructions obtained in the controller, and to enable one of the first and second optical paths while disabling the other one of the first and second optical paths.

4. The system of claim 3, wherein the system comprises path enabling optics, and said enabling and disabling are performed by controlling the path enabling optics.

5. The system of claim 4, wherein the path enabling optics comprises a fold mirror, wherein the fold mirror is positioned at the merging point when enabled and below the first optical path when disabled.

6. The system of claim 5, wherein the path enabling optics comprises no controllable device other than the fold mirror.

7. The system of claim 1, wherein each of the first and second optical paths provides an afocal beam at the merging point.

8. The system of claim 1, wherein the sensor subsystem comprises a plurality of sensors each of which is associated with a wavelength range, wherein at least two wavelength ranges are different from each other.

9. The system of claim 8, further comprising beamsplitting optics for splitting the beam provided at the merging point to output a separate beam for each sensor.

10. The system of claim 9, wherein the one or more sensors comprise a first sensor which comprises a transducer configured to be in an image plane, the first sensor comprises optics configured to receive the separate beam for the first sensor from the beamsplitting optics and to form an image in the image plane for the transducer, the optics forming an intermediate image, the optics comprising a frame around a location of the intermediate image, the frame being configured to reject stray light.

11. The system of claim 10, wherein the frame forms an intermediate pupil, and the optics comprises either an aperture-stop or a variable iris at the intermediate pupil.

12. The system of claim 11, further comprising a cooler for cooling the transducer and the aperture-stop.

13. The system of claim 12, wherein the cooler comprises a dewar holding the transducer and the aperture-stop.

14. The system of claim 1, wherein the telescope is an off-axis afocal three-mirror anastigmat (TMA) telescope.

15. A system comprising:
a sensor subsystem comprising one or more sensors configured to sense electromagnetic radiation, wherein the sensor subsystem comprises an optics assembly for use with the one or more sensors that is behind mirrors of a telescope when viewed from a front side of the system; and
the telescope having an output coupled to an input of the sensor subsystem;
wherein the one or more sensors comprise a first sensor which comprises a transducer configured to be in an image plane, the optics assembly configured to form an image in the image plane for the transducer, the optics assembly forming an intermediate image, the optics assembly comprising a frame around a location of the intermediate image, the frame being configured to reject stray light; and wherein the frame forms an intermediate pupil upstream of the frame before the transducer, and the optics assembly comprises a variable iris at the location of the intermediate pupil, wherein the variable iris is configured to define a used area of the mirrors of the telescope.

16. The system of claim 15, wherein the frame forms an intermediate pupil upstream of the frame before the transducer, and the optics assembly comprises an aperture-stop at the location of the intermediate pupil.

17. The system of claim 16, further comprising a cooler for cooling the transducer and the aperture-stop.

18. The system of claim 17, wherein the cooler comprises a dewar holding the transducer and the aperture-stop.

19. The system of claim 1, wherein the system further comprises a front side and a back side and turning optics, wherein the sensor subsystem comprising sensor subsystem optics for use with the one or more sensors that are behind mirrors of the telescope when viewed from the front side, wherein:

the first optical path arrives at a curved primary mirror in the first optical path while traveling from the front side;

a curved tertiary mirror in the first optical path outputs a beam in the first optical path towards the merging point, towards the front side, and away from the sensor subsystem optics to reach the merging point while traveling towards the front side and before being turned around by a turning optics towards the sensor subsystem optics located behind the telescope mirrors; and the turning optics turn around the first optical path downstream of the merging point to direct the first optical path towards the sensor subsystem optics.

20. The system of claim 15, further comprising a prism positioned after the frame with no optical elements disposed therebetween.

* * * * *